United States Patent [19]

Andres et al.

[11] Patent Number: 5,391,605

[45] Date of Patent: Feb. 21, 1995

[54] SELF-LUBRICATING COMPOSITION CONTAINING POLYBENZIMIDAZOLE, GRAPHITE AND BORON NITRIDE

[75] Inventors: Todd Andres; Eduardo Alvarez, both of Houston, Tex.; O. Richard Hughes, Chatham; William Cooper, Clinton, both of N.J.; Chun Wang, Missouri City, Tex.

[73] Assignee: Hoechst Celanese Corp., Somerville, N.J.

[21] Appl. No.: 121,085

[22] Filed: Sep. 14, 1993

Related U.S. Application Data

[63] Continuation of Ser. No. 883,830, May 15, 1992, abandoned.

[51] Int. Cl.$^6$ .................. C08J 5/10; C08K 3/38; C08L 79/08
[52] U.S. Cl. .................. 524/404; 524/495; 525/435
[58] Field of Search .................. 524/404, 495; 521/184; 525/435

[56] References Cited

U.S. PATENT DOCUMENTS

| | | | |
|---|---|---|---|
| 4,738,999 | 4/1988 | Blenner et al. | 524/80 |
| 4,810,730 | 3/1989 | Letinski et al. | 521/184 |
| 5,139,863 | 8/1992 | Alvarez et al. | 428/297 |

Primary Examiner—Paul R. Michl
Assistant Examiner—U. K. Rajguru
Attorney, Agent, or Firm—James L. McGinnis

[57] ABSTRACT

A polymeric composition containing internal lubricants is suitable for low friction applications. The composition contains from about 65 to about 85 weight percent of a polymeric blend and from about 15 to about 35 weight percent of internal lubricants, wherein said blend consists essentially of from about 35 to about 100 weight percent of polybenzimidazole and from about 0 to about 65 weight percent of poly(aryletherketone), and said lubricants consist essentially of graphite and boron nitride in a weight ratio of about 1:10 to about 10:1, respectively. The composition is useful for preparing shaped articles such as bearings, bearing sleeves, rings, etc.

16 Claims, 2 Drawing Sheets

SELF-LUBRICATING COMPOSITION CONTAINING POLYBENZIMIDAZOLE, GRAPHITE AND BORON NITRIDE

This is a continuation of application Ser. No. 07/883,830, filed on May 15, 1992, now abandoned.

FIELD OF THE INVENTION

The present invention is directed to a polybenzimidazole-containing composition containing internal lubricants and processes for the preparation of the composition. The composition is useful for forming low friction, shaped articles including bearings, bearing sleeves, rings, etc.

BACKGROUND OF THE INVENTION

Polybenzimidazoles and poly(aryletherketones) are polymers of high thermal stability and excellent resistance to oxidative and hydrolyric degradation. Polybenzimidazole and poly(aryletherketone) blends are known for their excellent mechanical, thermal and chemical resistance properties. U.S. Pat. No. 4,912,176 to Alvarez et al., herein incorporated by reference in its entirety, discloses blends of polybenzimidazole and polyaryleneketones and sintered articles produced therefrom. Alvarez '176 further discloses that polybenzimidazole/poly(aryletherketones) may be formed into article such as gaskets, seals, valve seats and O-ring backups.

However, these polybenzimidazole/poly(aryletherketone) articles are not highly durable and wear resistant when subjected to friction environments. These articles tend to overheat and degrade under low friction conditions after short periods of time. It is desirable to produce a polybenzimidazole-containing composition that exhibits good mechanical and physical properties as well as wear resistance in frictional environments.

BRIEF DESCRIPTION OF THE DRAWINGS

While the specification concludes with claims particularly pointing out and distinctly claiming the present invention, the present invention will be better understood from the following description and figures in which:

SUMMARY OF THE INVENTION

Figure 1:
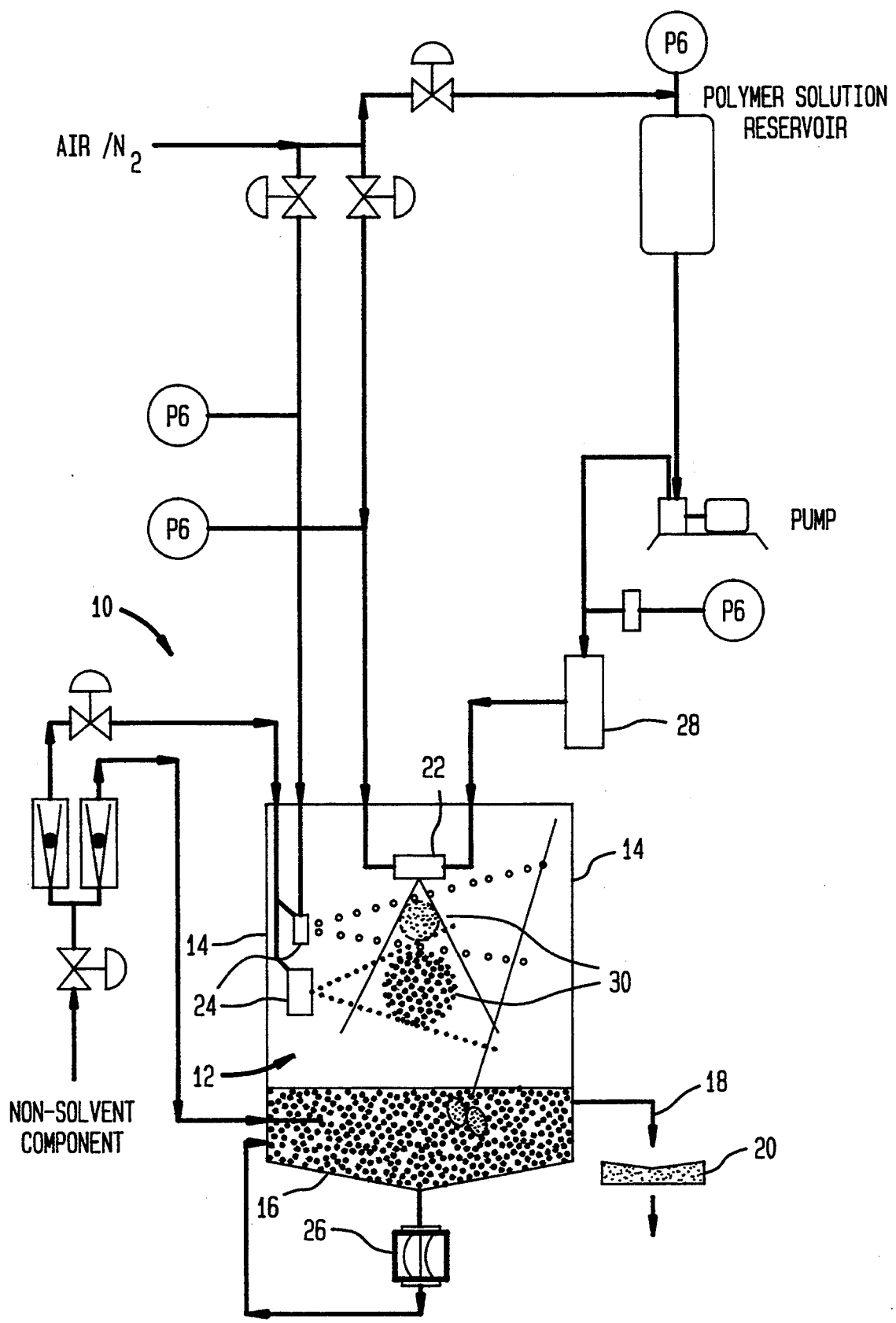
FIG. 1 is a schematic view in elevation of an atomization reactor utilized to form particles of the invention.

The present invention is directed to a polymeric composition containing internal lubricants being suitable for forming a low friction, shaped article containing from about 65 to about 85 weight percent of a polymeric blend and from about 15 to about 35 weight percent of internal lubricants, wherein said blend consists essentially of from about 60 to about 100 weight percent of an aromatic polybenzimidazole and from about 0 to about 40 weight percent of poly(aryletherketone), and said lubricants consist essentially of graphite and boron nitride in a weight ratio of about 1:10 to about 10:1, respectively.

DETAILED DESCRIPTION OF THE INVENTION

The Polymeric Blend

Generally, the aromatic polybenzimidazole useful in the present composition may be any polybenzimidazole resins known to those skilled in the art. Typical polymers of this class and their preparation are more fully described in U.S. Pat. No. 2,895,946; U.S. Pat. No. Re. 26,065; and the *Journal of Polymer Science*, Vol. 50, pages 511–539 (1961), which are herein incorporated by reference in their entirety. These polybenzimidazoles consist essentially of recurring units of the Formula I:

Formula I is:

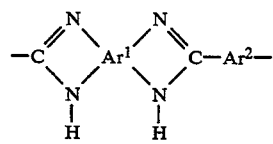

wherein $Ar^1$ represents a tetravalent aromatic moiety having the formula:

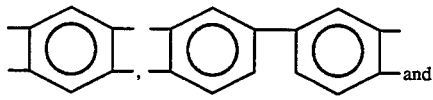

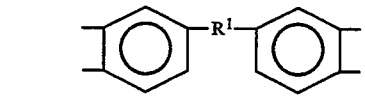

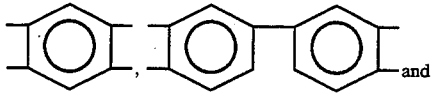

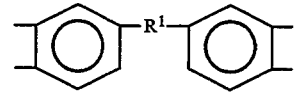

wherein $R^1$ is O, $SO_2$, CH=CH, $C(CF_3)_2$ or $(CH_2)_x$ and wherein x is an integer of from 1 to 4; and $Ar^2$ represents a divalent aromatic moiety having the formula:

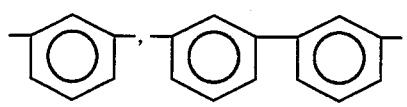

and

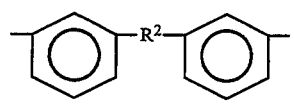

wherein $R^2$ is O, $SO_2$, CH=CH, $C(CF_3)_2$ or $(CH_2)_x$ and wherein x is an integer of from 1 to 4.

A useful polybenzimidazole for use in the present invention is poly-2,2'-(m-phenylene)-5,5'-bibenzimidazole.

The preferred polybenzimidazole is Celazole ® U-60 from Hoechst Celanese Corporation.

Poly(aryletherketones) and methods of preparation are well known to those skilled in the art. Suitable methods for preparing the poly(aryletherketones) of the invention are disclosed in U.S. Pat. Nos. 3,441,538; 3,442,857; 3,516,966; and 3,652,409 all of which are herein incorporated by reference in their entirety.

The preferred poly (aryletherketone) is polyetheretherketone (PEEK) having recurring units of the formula:

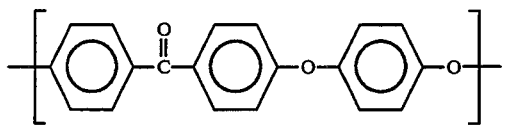

a preferred powder is available from ICI as Victrex 150 PF TM.

Generally, the polybenzimidazole/poly(aryletherketone) blend useful for forming the self-lubricating composition of the present invention contains from about 35 to about 100 weight percent of an aromatic polybenzimidazole and from about 0 to about 65 weight percent of poly(aryletherketone). Typically, the blend will contain from about 40 to about 95 weight percent of polybenzimidazole and from about 5 to about 60 weight percent of poly (aryletherketone), based on the total weight of the blend.

Polymeric Blend Solution Preparation

The polymeric blend of the invention is generally formed from a polymeric solution (i.e., dope). The polymeric solution may be prepared by separately or jointly dissolving a polybenzimidazole and poly(arlyetherketone) resin in a suitable solvent. While any substance that will dissolve both resins is suitable for forming the solution of the invention, typical solvents are N,N'-dimethylacetamide, N,N'-dimethylformamide, dimethylsulfoxide, and N-methyl-2-pyrrolidone, formic acid, acetic acid, sulfuric acid, polyphosphoric acid, and methanesulfonic acid. Particularly, the preferred solvent is N,N'-dimethylacetamide (DMAc) having a concentration of from approximately 90 to approximately 100 percent, and preferably approximately 99 percent by weight.

Methods of dissolving the polymers in a variety of solvents are known to those skilled in the art. One suitable method requires drying the starting polymers to a moisture level of about 2 weight percent in a vacuum oven at a temperature of about 100° C. to about 160° C. for about 10 to about 16 hours. Preferred conditions for dissolving the polymers comprise heating the mixture of polymer and solvent in a stainless steel reactor at a pressure of from about 2 to about 7 atmospheres for about 2 hours at a temperature of from about 25° to about 125° C. The resulting solution is preferably filtered to remove any undissolved polymer prior to being processed. Optionally, the two polymers may be individually dissolved in the solvent and subsequently mixed together in the desired proportions.

The solution or dope of the polymeric resin dissolved in a suitable solvent generally contains from about 5 to about 35 percent by weight of polymer solids, based on the total weight of the solution. Typically, however, the solution will contain from about 10 to about 30 percent by weight of solids, and preferably, the solution will contain about 25 percent by weight of polymer solids, based on the total weight of the solution.

The Lubricants

The lubricants useful in the polymeric composition of the present invention include graphite crystals and fibers, boron nitride, and mixtures thereof. Preferably, the lubricants contained in the composition will include graphite crystals (i.e, particles), graphite fibers and boron nitride powder. The preferred particulate (i.e., powder) graphite lubricants are those distributed by Superior Graphite Co. under the names Crystalline Graphite, High Purity Grade 4939 TM, Crystalline Graphite Grade 4735 TM, and Crystalline Graphite 4935 TM. The preferred graphite fibers which also act as a filler or reinforcement agent are Magnamite Fibers 1810AS TM distributed by Hercules. The boron nitride useful in the composition is distributed by Union Carbide under the trade name UCAR Boron Nitride Powder Grade HCP TM.

The Coupling Agent

A coupling agent is utilized to bind the components of the polymeric composition together. The agent may contain, as an active ingredient, neoalkenolate-tris(3-amino)phenylatozirconium (VI). The preferred coupling agent is NZ09 distributed by Petro Chemicals. A mixture of about 90 wt % of NZ09 and about 10 wt % of PBI particles are blended together to form an NZ09 Master Batch.

The Polymeric Composition

The polymeric composition of the invention which is suitable for forming a low friction shaped article contains from about 25 to about 35 weight percent of polybenzimidazole, from about 40 to about 50 weight percent of poly(aryletherketone), from about 10 to about 15 weight percent of graphite fibers, from about 5 to about 15 weight percent of graphite powder, from about 1 to about 5 weight percent of boron nitride, and from about 1 to about 5 weight percent of a coupling agent, based on the total weight of the composition. Preferably, the polymeric composition will contain about 27.5 weight percent of polybenzimidazole, about 40.5 weight percent of poly(aryletherketone), about 12.25 weight percent of graphite fibers, about 10.2 weight percent of graphite particles, about 3.0 weight percent of boron nitride, and about 2.55 weight percent of coupling agent.

After preparation of the polymeric solution, the filler and lubricants are thoroughly mixed therewith to form a polymer-lubricant slurry. Initially, the lubricants (i.e., graphite and boron nitride) are dry blended in suitable proportions and added to the polymeric solution to form a slurry. Adding the lubricants to the polymeric solution is believed to cause polymer encapsulation of the lubricants which results in shaped articles exhibiting improved strength and modulus.

Particles of the polymeric composition of the invention may be formed from the slurry by precipitation and spray-atomization/quenching of polymer-lubricant slurry.

Generally, the method of forming particles by precipitation requires the combination of the slurry and a non-solvent. The slurry, containing the polymeric solution and lubricants may be added to a suitable non-solvent (i.e., direct precipitation) or the non-solvent may be added to the slurry (i.e., reverse precipitation). In either case the components are mixed together while undergoing constant shearing, and an excess amount of non-solvent is utilized to precipitate all the particles out of the polymeric solution.

An atomization reactor system, as illustrated in FIG. 1, is utilized to form the highly porous particles of the invention. The reactor system (10) has a cylindrical vessel (12) with upstanding side walls (14) and a cone-shaped bottom (16) with an outlet (18) equipped with a particle separation system (20). Typical reactor dimensions are about 36 inches in diameter by about 37 inches in height. A plurality of nozzles are contained within the reactor. The first set of nozzles (22), slidably attached to the top-center of the reactor, are utilized to atomize the resin solution downwardly into the reactor. A second set of nozzles (24), equaling about four times the quantity of the first nozzle set, separated into an equal number of rows (i.e. four), equally spaced and attached to the reactor side walls at positions well below the first nozzle set, are utilized to atomize the non-solvent component in a direction perpendicular to that of the resin solution and horizontally into the reactor to create an aggregation zone. A recirculation pump (26) is positioned in the bottom of the reactor to maintain suspension of the rounded particles in the non-solvent solution prior to discharging through outlet (18).

The atomization nozzles, manufactured by Spraying Systems of Wheaton, Ill., produce a wide-angle rounded spray pattern using a No. 1 spray set-up containing Fluid Cap 2050 and Air Cap 64. Under normal operation at 60 psi the nozzles are capable of delivering 0.79 gallons of liquid per hour at a spray angle of about 18 degrees. The polymer solution is pumped from a reservoir through a filtering system (28) to remove undissolved resin before feeding it through the first inlet of nozzles (22). To aid atomization, a gas such as air or nitrogen is fed into a second inlet of the nozzles (22) as is typical of gas-operated atomization nozzles. These nozzles (22) are suspended along the upper-vertical axis of the reactor in such a way as to spray fine droplets of the resin solution down into the reactor. The non-solvent component (e.g. water or alcohol) is fed into a first inlet of each of the second set of nozzles (24) while a compressed gas such as air or nitrogen is fed into a second inlet of each second nozzle (24) to aid in atomization. When the non-solvent component is water, from about 1 to about 2 weight percent DMAc is sometimes added to dilute the solvent. If the solvent is not adequately diluted the precipitated particles will often remain soft and may agglomerate.

During operation of the reactor, the polymer solution aerosol jet is discharged from the first set of nozzles (22) downwardly into the atomized atmosphere of the non-solvent component, which is discharging horizontally into the agglomeration (i.e. reaction) zone (30) in the form of an aerosol jet from the second set of nozzles (24) to form highly porous particles. An initial quantity of non-solvent component, e.g. water, is accumulated in the reactor bottom to maintain suspension of the highly porous particles as they are formed, as well as to complete any residual precipitation from solution that may be necessary. Typically, the reactor is operated at atmospheric pressure, but other pressures are possible. The contents in the bottom of the reactor (i.e., polymeric particles suspended in the non-solvent component) are constantly recirculated to aid in suspension of the particles before discharging through outlet (18). To separate the suspended particles from the solvent—non-solvent solution, the outlet of the reactor is typically equipped with a separation system (20). The separation system can comprise any of several methods known in the art including vacuum filtration or centrifugation. For example, the particles can be collected on the filter and washed to remove residual solvent and non-solvent components, or the slurry can be centrifuged to produce a wet cake which can be washed and dried. The wet cake that results after filtration or centrifugation must be dried to a controlled or defined moisture content that assures adequate cold compactibility. One of several approaches can be adopted: 1—wet cake powder can be dried to lower non-solvent content (<7 wt %) and humidified to the desired moisture content (7-12 wt %); or 2—the wet cake powder can be dried directly to the desired moisture content (when the non-solvent is water). Thereafter, the dried, free-flowing highly porous particles can be milled and screened if so desired to produce submicron particles.

In both of the methods described hereinbefore, the miscibility of the solvent and non-solvent causes precipitation of the polymer particles which are collected, washed to remove residual solvent and dried. The non-solvent may be any solution which is miscible with the solvent but not the resin of the polymeric solution. Typical non-solvents useful with the solvents referenced hereinbefore include water and $C_1$ to $C_4$ aliphatic alcohols, i.e., methanol, ethanol, etc. The preferred non-solvent is water.

In the case of compositions containing higher concentrations of poly(aryletherketones), the composition may be extruded and injection molded into self-lubricating, shaped articles. In the case of compositions containing lower concentrations of poly(aryletherketones), the composition may be compressed into a densified, self-lubricating, shaped article utilizing the direct forming method and apparatus illustrated in FIG. 2.

Figure 2:
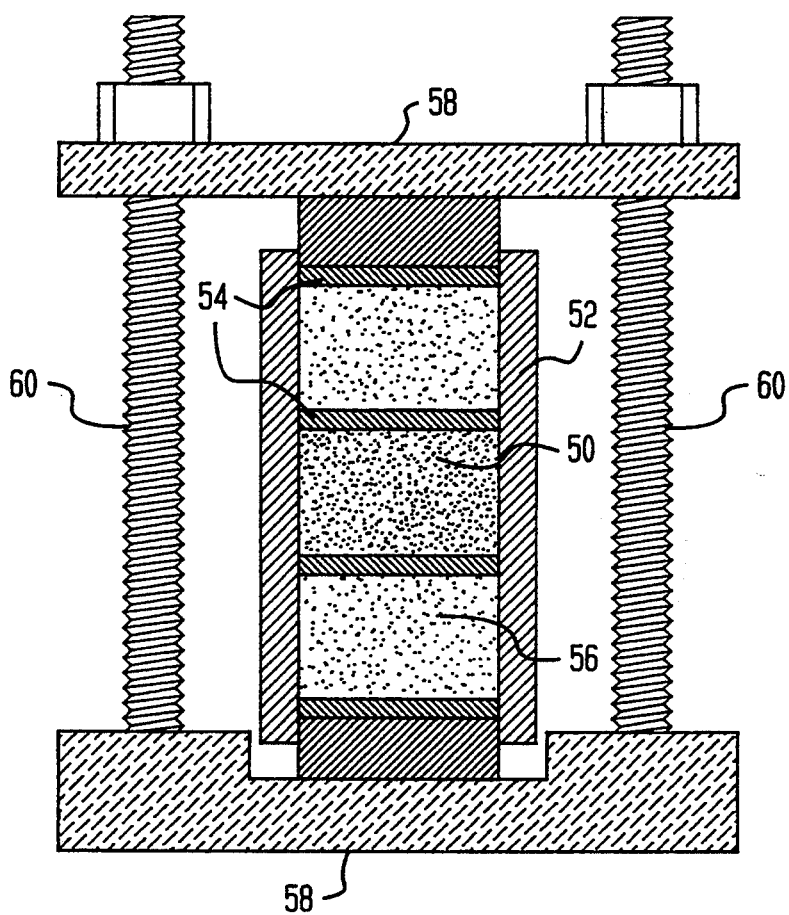
FIG. 2 is a front view in elevation of a heat treating shell system utilized for shaped articles of the invention.

Referring to FIG. 2, the polymeric composition (50) is placed into the molding means (52) followed by placing end plates (54) on each side of the composition. Next, the flowable resilient, compactible material (56), e.g., Graphite 9400 TM from Superior Graphite, is placed in the molding means over the end plates in such a way that the composition is separated from the resilient, compactible material. Optionally, additional end plates can be placed over the resilient, compactible material to prevent any loss of material from the molding means. Thereafter, the molding means (50) containing the aforementioned components is placed into a clamping means comprising slidingly opposed base plates, consisting of a first base plate having a raised surface (58) and second base plate having a raised surface (58) connected by locking means (60) in such a way that the base plates raised surfaces slidably contact the resilient compactible material or optional end plates. A uniaxial pressure is placed against the base plates to force the raised surfaces to slide inward and cause a pressure transmission to the polymeric material. The pressure is held constant by locking means (62), and the heat treating shell system is placed into an oven containing an air or inert gas atmosphere such as nitrogen, argon, etc., at the desired temperature for the desired time. Upon completion of the heat treating step, the pressure of the molding means is reduced to atmospheric conditions, the clamping means is disassembled, the molding means withdrawn therefrom, and the heat treated, shaped polymeric article is removed. During the process, the polymeric composition is compacted by a pressure transmission from the pressurizing means to the clamping means to the resilient, compactible material to the polymeric composition by way of the molding means. The process utilizes pressures ranging from approximately 2 to approximately 60 ksi, heat treating temperatures ranging from approximately 200° to approximately 700° C., and heat treating times ranging from approximately 5 to 10 hours.

Shaped articles such as bearings, bearing sleeves, rings and other self-lubricating article which exhibit good mechanical and physical properties may be formed from the composition of the present invention.

The following examples are general illustrations of preparing the polymeric composition of the invention. They are provided for purposes of exemplification only as should be appreciated from the foregoing discussion.

EXAMPLE 1

Dry Blend of PBI/PEEK and Boron Nitride-Graphite Composition

To prepare a dry blend of a polymeric composition containing PBI, boron nitride and graphite, the following components were utilized:

378 gm of Celazole ® PBI powder, 100 mesh;
611.7 gm of PEEK;
168.4 gm of Graphite Fibers;
140.2 gm of Graphite 4939;
42 gm of Boron Nitride powder; and
34.4 gm of NZ09 Master Batch The resins, i.e., PBI and PEEK, were dried in a dehumidifier overnight at a temperature of 390° F. To a Henschel mixer operated at moderate speed, the lubricants and filler were added and sheared for about 5 minutes; thereafter, the resin powders were slowly added to the mixer and sheared an additional 10 minutes after. Finally, the coupling agent (NZ09 Master Batch) was added to the mixer, and the blend was sheared for an additional 5 minutes. The blend was extruded utilizing a multizone, twin screw extruder operated at 350 rpm, a feeder temperature of 175° C., a torque of from 27 to 70%, zone temperatures of from 425° to 470° C.; the feed rate of the blend was from about 15 to 52 lbs/hr to form pellets. The pellets were dried at a temperature of 325° to 390° F. in a forced air descant oven. Thereafter, the pellets were fed into an injection mold operated at conventional pressure, velocity and cycle time settings, a nozzle temperature setting of 750° to 825° F., and barrel temperature setting of 800° to 825° F. to form disk for mechanical and tribological analyses.

COMPARATIVE EXAMPLE 2

Dry Blend of PBI and 5 wt % Graphite Composition

A sufficient quantity of PBI resin, 100 mesh was dehumidified overnight at 390° F., 431 gm of this resin and 22.68 gm of Graphite 4939 were slowly added to a Henschel mixer operated at a moderate speed. Upon completion of the addition, the blend was sheared for 10 minutes. The dry blend was compression molded utilizing the apparatus in FIG. 2 at a temperature of 890° F. and a pressure of 40 tons for 4 hours to form disks. After cooling, the disks were removed from the mold for mechanical and tribological analyses.

COMPARATIVE EXAMPLE 3

Dry Blend of PBI and 10 wt % Graphite Composition

The procedures of Comparative Example 2 were utilized to prepare a dry blend containing 408.6 gm of PBI resin, 100 mesh and 45.4 gm of Graphite 4939. The blend was ball milled for 2 hours and compressed into disks utilizing the procedure and apparatus of Comparative Example 2. Mechanical and tribological analyses were performed on the disks.

EXAMPLE 4

Precipitation of PBI and Boron Nitride-Graphite Composition

Utilizing a 26.5 wt % PBI solution (standard dope) maintained at 50° C., a 7.5 wt % PBI solution was prepared by mixing 85 gm of DMAc and 35.5 gm of the standard dope. Boron nitride and Graphite 4939 in the amounts of 27.5 gm and 27.5 gm, respectively were mixed with the dope. 27.5 gm of boron nitride and graphite in a 10:1 weight ratio was added to this solution to form a slurry. To a Waring blender containing 1000 ml of water which was agitated sufficiently to vortex the solution without adding air, the slurry was slowly poured directly into the shoulder of the vortex. PBI-lubricant particles precipitated out of the DMAc when contacted with the water. After the solution addition was complete, additional water was added to the blender to bring the liquid level to one liter, and agitation was continued for an additional 2 to 3 min. The solution was vacuum filtered through a No. 4 Whatman filter. The precipitate was added to the blender containing 1000 ml of hot distilled water and agitated for 3 to 5 minutes to remove any excess solvent. After this procedure was performed three times, the precipitate was vacuum filtered and dried in a vacuum oven overnight at 150° C. The dried polymeric composition was compressed into disks utilizing the apparatus and conditions of Comparative Example 2. Mechanical and tribological analyses were performed on the disks.

COMPARATIVE EXAMPLE 5

Precipitation of PBI and Boron Nitride Composition

Utilizing a 26.5 wt % PBI solution (standard dope) maintained at 50° C., a 7.5 wt % PBI solution was prepared by mixing 85 gm of DMAc and 35.5 gm of the standard dope. Boron nitride in the amount of 27.5 gm was mixed with the solution to form a slurry. A Waring blender containing 500 ml of distilled water was agitated at a sufficient speed to vortex the water without the addition of large amounts of air and the slurry was slowly poured directly into the water on the shoulder of the vortex. PBI particles began to precipitate from the solution. Thereafter, the liquid level of the blender was brought to the 1 liter level by the addition of water and the mixture was agitated for an additional 2 to 3 minutes. The mixture was poured into a Buchner funnel and filtered. The precipitate was washed in the blender with 100 ml of hot distilled water for about 3 to 5 minutes, and the water was decanted from the solids. After this procedure was repeated three times, the final wash was filtered to form a cake which was dried overnight at 150° C. in a vacuum oven. The dried particles were compressed into disks utilizing the apparatus and procedure of Comparative Example 2. Mechanical and tribological analyses were performed on the disks.

EXAMPLE 6

Spray-Atomization of PBI and Boron Nitride-Graphite Composition

To 12 wt % PBI solution containing 540 gm of PBI were added 27 gm of Graphite 4934 and 27 gm of HCP boron nitride to produce a slurry containing 5 wt % of graphite and 5 wt % boron nitride. The slurry was filtered to remove impurities and any undissolved solids. Utilizing the apparatus of FIG. 1, the slurry was fed through a pumping system to the first set of nozzles at a rate of 12.4 cm$^3$/min and a pressure of 30 psi along with nitrogen gas at 15 psi was fed to the same nozzle to atomize the slurry. Water (75,700 gm) was purged with nitrogen for 48 hours followed by the addition of 764 gm (1 wt. %) of DMAc thereto. A portion of this water was utilized to provide a liquid layer in the bottom of the tank, and the excess water was fed to the second set of nozzles located in the tank at a rate of 1080 cm$^3$/min assisted by nitrogen gas at 10 psi and a pressure of 25 psi. Highly porous, rounded polymeric particles formed as a result of the operation were collected from the bottom of the tank, filtered, centrifuged, washed and dried. These particles were Kady milled for 1 hour at 90° C., and thereafter directly formed into disks utilizing the apparatus and conditions of Comparative Example 2. Mechanical and tribological analyses were performed on the disks.

EXAMPLE 7

Spray Atomization of PBI/PEEK and Boron Nitride-Graphite Composition

To a 12 wt % PBI solution containing 475.0 gm of PBI was added sufficient 35 wt % PEEK solution containing 768.6 gm of PEEK to prepare a polymeric solution comprising 38/62 weight ratio of PBI to PEEK. A lubrication blend containing 176.2 gm of Graphite 4939, 211.6 gm of Magnamite Fibers 1810AS and 51.8 gm of HCP boron nitride was mixed together and added to the polymeric solution to form a slurry. The slurry was filtered and spray-atomized utilizing the apparatus and conditions of Example 6. The particles were formed into disks utilizing the apparatus and conditions of Comparative Example 2. Mechanical and tribological analyses were performed on the disks.

We claim:

1. A polymeric composition containing internal lubricants, said composition being suitable for forming a low friction, shaped article, comprising from about 65 to about 85 weight percent of a polymeric blend and from about 15 to about 35 weight percent of internal lubricants, based on the total weight of the composition, wherein said blend consists essentially of from about 35 to about 100 weight percent of an aromatic polybenzimidazole and from about 0 to about 65 weight percent of poly(aryletherketone), and said lubricants consist essentially of boron nitride powder and graphite in a weight ratio of about 1:10 to about 10:1, respectively, and wherein said lubricants are well dispersed within the polymeric blend.

2. The polymeric composition according to claim 1 wherein the aromatic polybenzimidazole is poly-2,2'-(m-phenylene)-5,5'-bibenzimidazole.

3. The polymeric composition according to claim 2 wherein the poly(arlyetherketone) is polyetheretherketone.

4. The polymeric composition according to claim 3 wherein the graphite is selected from the group consisting of graphite fibers, graphite particles and mixtures thereof.

5. A polymeric composition containing internal lubricants, said composition being suitable for forming a low friction shaped article, comprising from about 25 to about 35 weight percent of polybenzimidazole, from about 40 to about 50 weight percent of poly(aryletherketone), from about 10 to about 15 weight percent of graphite fibers, from about 5 to about 15 weight percent of graphite powder, and from about 1 to about 5 weight percent of boron nitride powder, based on the total weight of the composition.

6. A self lubricating, shaped article formed from the polymeric composition according to claim 5.

7. A self-lubricating shaped article suitable for low friction applications prepared from a polymeric composition containing internal lubricants, said composition comprising from about 65 to about 85 weight percent of a polymeric blend and from about 15 to about 35 weight percent of internal lubricants, based on the total weight of the composition, wherein said blend consists essentially of from about 35 to about 100 weight percent of an aromatic polybenzimidazole and from about 0 to about 65 weight percent of poly(aryletherketone), and said lubricants consist essentially of boron nitride powder and graphite in a weight ratio of about 1:10 to about 10:1, respectively, and wherein said lubricants are well dispersed within the polymeric blend.

8. The shaped article according to claim 7 wherein the aromatic polybenzimidazole is poly-2,2'-(m-phenylene)-5,5'-bibenzimidazole.

9. The shaped article according to claim 8 wherein the poly(aryletherketone) is polyetheretherketone.

10. A self lubricating, shaped article containing internal lubricants, said article being useful for low friction applications, comprising from about 25 to about 35 weight percent of polybenzimidazole, from about 40 to about 50 weight percent of poly(aryletherketone), from about 10 to about 15 weight percent of graphite fibers, from about 5 to about 15 weight percent of graphite particles, and from about 1 to about 5 weight percent of boron nitride powder, based on the total weight of the composition.

11. The self-lubricating article according to claim 10 selected from the group consisting of bearings, bearing sleeves and rings.

12. A lubricated polymeric composition comprising a high temperature aromatic polymer intimately combined with a lubricating system which consists essentially of boron nitride powder and graphite in a weight ratio of 10:1 to 1:10.

13. The polymeric composition as recited in claim 5, said composition further comprising a coupling agent.

14. The polymeric composition as recited in claim 13, wherein said coupling agent comprises neoalkenolate-tris(3-amino)phenylatozirconium(VI).

15. A self-lubricating, shaped article as recited in claim 10, said article further comprising a coupling agent.

16. A self-lubricating, shaped article as recited in claim 15, wherein said coupling agent comprises neoalkenolate-tris(3-amino)phenylatozirconium(VI).

* * * * *